(12) United States Patent
Bendsen et al.

(10) Patent No.: US 7,363,578 B2
(45) Date of Patent: Apr. 22, 2008

(54) METHOD AND APPARATUS FOR MAPPING A DATA MODEL TO A USER INTERFACE MODEL

(75) Inventors: Per Bendsen, Copenhagen (DK); Peter Christensen, Hørsholm (DK); Peter Villadsen, Copenhagen (DK)

(73) Assignee: Microsoft Corporation, Redmond, WA (US)

( * ) Notice: Subject to any disclaimer, the term of this patent is extended or adjusted under 35 U.S.C. 154(b) by 243 days.

(21) Appl. No.: 10/860,225

(22) Filed: Jun. 3, 2004

(65) Prior Publication Data

US 2005/0273763 A1  Dec. 8, 2005

(51) Int. Cl.
G06F 17/00 (2006.01)
(52) U.S. Cl. ............... 715/236; 715/239; 715/780
(58) Field of Classification Search ........... 715/513, 715/522, 523, 236, 239, 780
See application file for complete search history.

(56) References Cited

U.S. PATENT DOCUMENTS

| 5,649,190 | A | | 7/1997 | Sharif-Askary et al. |
|---|---|---|---|---|
| 5,999,948 | A | | 12/1999 | Nelson et al. |
| 6,012,098 | A | * | 1/2000 | Bayeh et al. ............ 709/246 |
| 6,657,584 | B2 | | 12/2003 | Cavallaro et al. |
| 6,704,743 | B1 | | 3/2004 | Martin |
| 7,194,683 | B2 | | 3/2007 | Hind et al. |
| 2002/0030625 | A1 | | 3/2002 | Cavallaro et al. |
| 2002/0083068 | A1 | | 6/2002 | Quass et al. |
| 2002/0105548 | A1 | | 8/2002 | Hayton et al. |
| 2002/0111922 | A1 | | 8/2002 | Young et al. |
| 2003/0058277 | A1 | | 3/2003 | Bowman-Amuah |
| 2003/0221165 | A1 | | 11/2003 | Young et al. |
| 2005/0005259 | A1 | | 1/2005 | Avery et al. |
| 2005/0027620 | A1 | | 2/2005 | Taylor et al. |
| 2005/0065777 | A1 | | 3/2005 | Dolan et al. |
| 2005/0234688 | A1 | | 10/2005 | Pinto et al. |
| 2006/0004845 | A1 | | 1/2006 | Kristiansen et al. |
| 2006/0235764 | A1 | | 10/2006 | Bamborough et al. |

OTHER PUBLICATIONS

"XSL Transformations," Wikipedia, http://en.wikipedia.org/wiki/XSL_Transformations, Last modified Nov. 27, 2006.*
Bettin, J., "Model-Driven Architecture Implementation & Metrics", SoftMetaWare,Ltd., Version 1.1, Aug. 28, 2003.
Lämmel et al., R., "Maping a Conceptual to a Relational Schema", Feb. 16, 2004.
Baxley, B., "Universal Model of a User Interface", http://www.aiga.org/resources/content/9/7/8/documents/baxley.pdf, at least by Apr. 26, 2004.

(Continued)

*Primary Examiner*—Stephen Hong
*Assistant Examiner*—Adam M. Queler
(74) *Attorney, Agent, or Firm*—John D. Veldhuis-Kroeze; Westman, Champlin & Kelly, P.A.

(57) ABSTRACT

A method, computer readable medium and system are provided which generate a model driven form user interface. In accordance with the method, a data model is mapped to a user interface model using at least one declarative map. The one or more declarative maps used to map the data model to the user interface model can be explicit maps which are external to a mapping engine used to generate the user interface model and any intermediate models.

25 Claims, 7 Drawing Sheets

OTHER PUBLICATIONS

Karsai et al., G. "Graph Transformations In OMG's Model-Driven Architecture", http://www.isis.vanderbilt.edu/publications/archive/ Karsai G 12 0 2003 Graph Tran.pdf, at least by Apr. 26, 2004.

Balasubramanian et al., K. "Model Driven Middleware: A New Paradigm for Developing and Provisioning Distributed Real-time and Embedded Applications", Science of Computer Programming, Nov. 14, 2003.

"Unify NXJ Forms Processing—Application Development using Unify NXJ Application Designed" NXJ Technical White Paper, at least by Apr. 26, 2004.

Kobro et al., R. "What is Model Driven Architecture?" University of Oslo, Research Report 304, ISBN 82-7368-256-0, ISSN 0806-3036, Mar. 2003.

"User Interface Markup Language (UIML) Draft Specification) Draft Specification", Harmonia, Inc., Jan. 17, 2004.

Bernstein, P.A., "Applying Model Management to Classical Meta Data Problems", Proceedings CIDP 2003, pp. 209-220, 2003.

Microsoft, "BizTalk Server 2004 Architecture—White Paper", Dec. 2003.

Microsoft Business Solutions, Microsoft Business Solutions-Axapta 3.0 Overview, Jul. 2003. http://microsoft.com/businessSolutions/axapta/.

Microsoft Developers Network (MSDN), Avalon, 2003. http://msdn.microsoft.com/longhorn/understanding/pillars/avalon.

Office Action dated Jul. 12, 2006 for U.S. Appl. No. 10/860,306, filed Jun. 3, 2004.

Office Action dated Jan. 10, 2007 for U.S. Appl. No. 10/860,226, filed Jun. 3, 2004.

Budzikowska et al., Conversational Sales Assistant for Online Shopping, ACM Mar. 2001, pp. 1-2.

Lehtonen et al., A Dynamic User Interface for Document Assembly, ACM 2002, pp. 134-141.

Zdun, Dynamically Generating Web Application Fragments from Page Templates, ACM 2001, pp. 1113-1120.

\* cited by examiner

METHOD AND APPARATUS FOR MAPPING A DATA MODEL TO A USER INTERFACE MODEL

CROSS-REFERENCE TO RELATED APPLICATIONS

Reference is hereby made to the following co-pending and commonly assigned patent application: U.S. application Ser. No. 10/860,226, filed Jun. 3, 2004, entitled "METHOD AND APPARATUS FOR GENERATING FORMS USING FORM TYPES" and U.S. application Ser. No. 10/860,306, filed Jun. 3, 2004, entitled "METHOD AND APPARATUS FOR GENERATING USER INTERFACES BASED UPON AUTOMATION WITH FULL FLEXIBILITY", both of which are hereby incorporated by reference in their entirety.

BACKGROUND OF THE INVENTION

The present invention relates to the generation of forms. More particularly, the present invention relates to methods and apparatus for generating and updating form user interfaces (UIs).

In typical business software products and applications, such as enterprise resource planning (ERP) products, a large number of forms or form user interfaces are used. It is not uncommon for the number of forms which are used in conjunction with a business software application to exceed several thousand. Developing and maintaining a large number of forms has traditionally been a labor-intensive task for software developers.

As an example of a real life business application, consider Microsoft Business Solutions-Axapta®, which has close to 3,000 tables, resulting in close to 2,000 forms. Each form has to be aligned with the layout of each table from which the run-time data is bound. The forms and related form logic, such as input validation, have to be aligned whenever the table layout changes and when business logic changes. Adding to the complexity is the increasing number of different client platform technologies. The classic Windows UI is now accompanied by the Web Browser. In the near future, personal digital assistant (PDA), cell phone, and other UI technologies will be adding to complexity.

The Internet has taught end users that they do not need a 14 day course to learn how to use an application. End users expect applications to guide them via tasks, and they expect the application to look appealing. Because more user roles are exposed to the information technology presented through business applications, there is an increasing demand that forms reflect the information each user needs and the tasks that each role has to achieve. All in all the demands on user experience are increasing.

Typically, the user experience and developer experience pull in opposite directions. Good user experience takes longer for an application developer to create and maintain. The vision of having an excellent user experience, and at the same time, supporting high developer productivity, can seem contradictory. This is particularly true in the area of forms generation for business applications.

Applications presenting information must provide their users with as rich an experience as possible on platforms of very diverse capabilities (ranging from rich clients running on the user's desktop, to Web clients running in the user's browser, to Pocket Digital assistants, telephony based devices, and even speech interfaces). A business architect uses his or her knowledge in business engineering to solve problems for the customer. This person is not a computer program developer, and should be protected from the intricacies of program development.

The present invention provides solutions to one or more of the above-described problems and/or provides other advantages over the prior art.

SUMMARY OF THE INVENTION

A method, computer readable medium and system are provided which generate a model driven form user interface. In accordance with the method, an application/business model, referred to here as a data model, application model or problem domain model, is mapped to a user interface model using at least one declarative map. These terms for models used to describe the present invention are representative of both the data in the application, and additional UI related information. The step of mapping the data model to the user interface model using at least one declarative map can include mapping the data model to the user interface model using a plurality of declarative maps in a plurality of mapping steps. In one such mapping step, the data model can be mapped to a logical control model using a first declarative map. The first declarative map can be an explicit map which is external to a mapping engine used to generate the logical control model.

The data model can be any of a variety of model types having datum of differing datum types. For example, the data model can be a database, a table, an entity, an object, etc. In embodiments in which the data model is mapped to a logical control model using a first declarative map, the first declarative map is used to map each of the datum types in the model to one of multiple logical controls available for use in the logical control model. The logical controls, and thus the logical model, are free from dependencies to any specific display target or platform.

In some embodiments, in another step, the logical control model is mapped to a physical control model using a second declarative and explicit map. The physical control model has physical controls used to render the logical control model (and thus the data model) on a display target. A display target is a vessel used by the user to communicate with the business logic. In still another step of some embodiments, the physical control model can be mapped to a native control model (a display target specific model) using a third declarative and explicit map. The native control model has instances of native controls used to interact with a person.

Other features and benefits that characterize embodiments of the present invention will be apparent upon reading the following detailed description and review of the associated drawings.

BRIEF DESCRIPTION OF THE DRAWINGS

FIG. 3-1 is a block diagram illustrating an example business model.

FIG. 3-2 is a block diagram illustrating an entity business model mapped to a form.

FIG. 4-1 is a block diagram illustrating a process of generating models using maps and other models.

FIG. 4-2 is a block diagram illustrating a process of generating a native control model (display target specific model) from an initial user or business model through a series of mappings.

FIG. 4-3 is a block diagram illustrating a process of the type shown in FIGS. 4-1 and 4-2 for an example embodiment.

DETAILED DESCRIPTION OF ILLUSTRATIVE EMBODIMENTS

Figure 1:
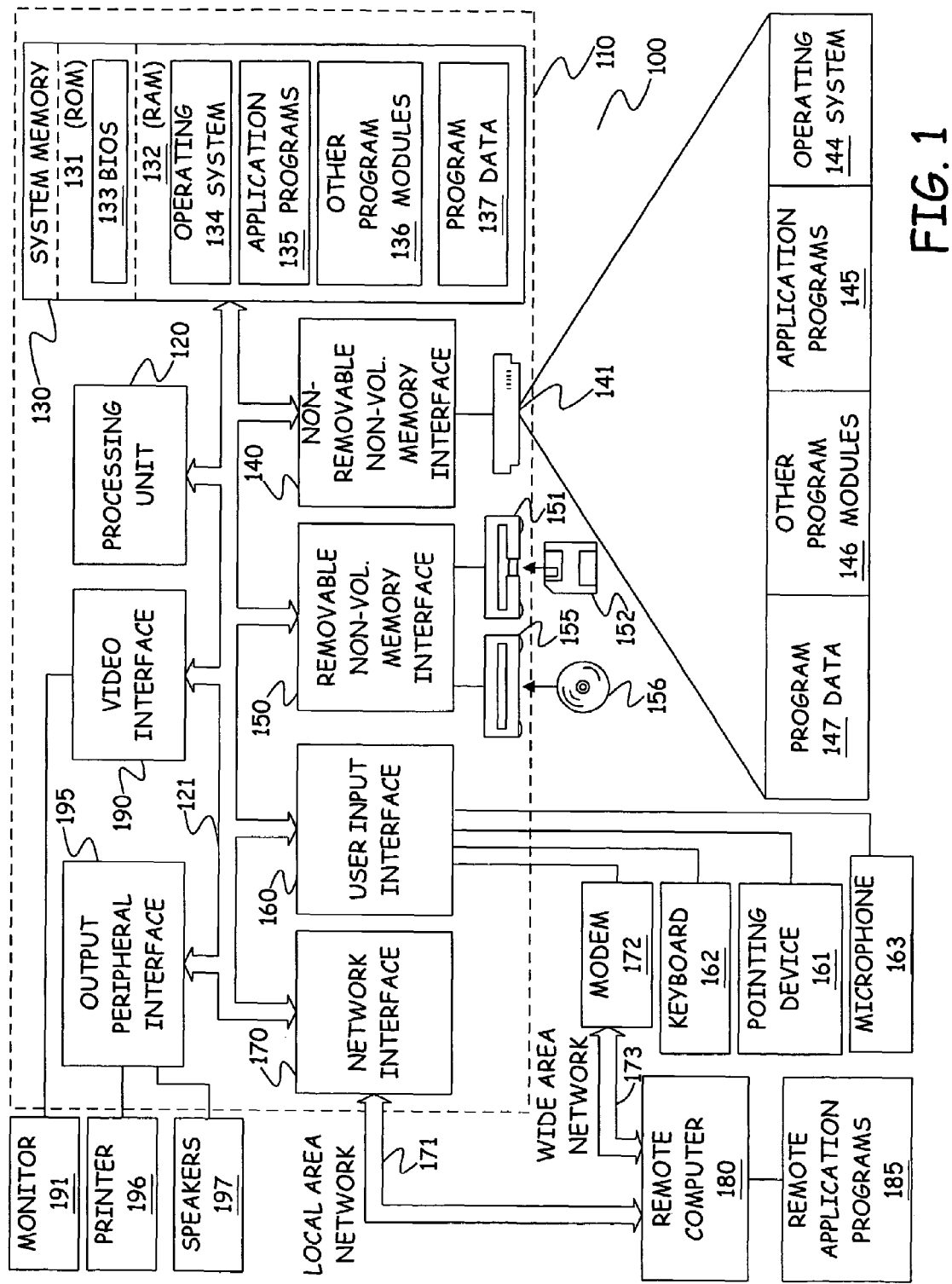
FIG. 1 is a block diagram of one exemplary environment in which the present invention can be used.
Figure 2:
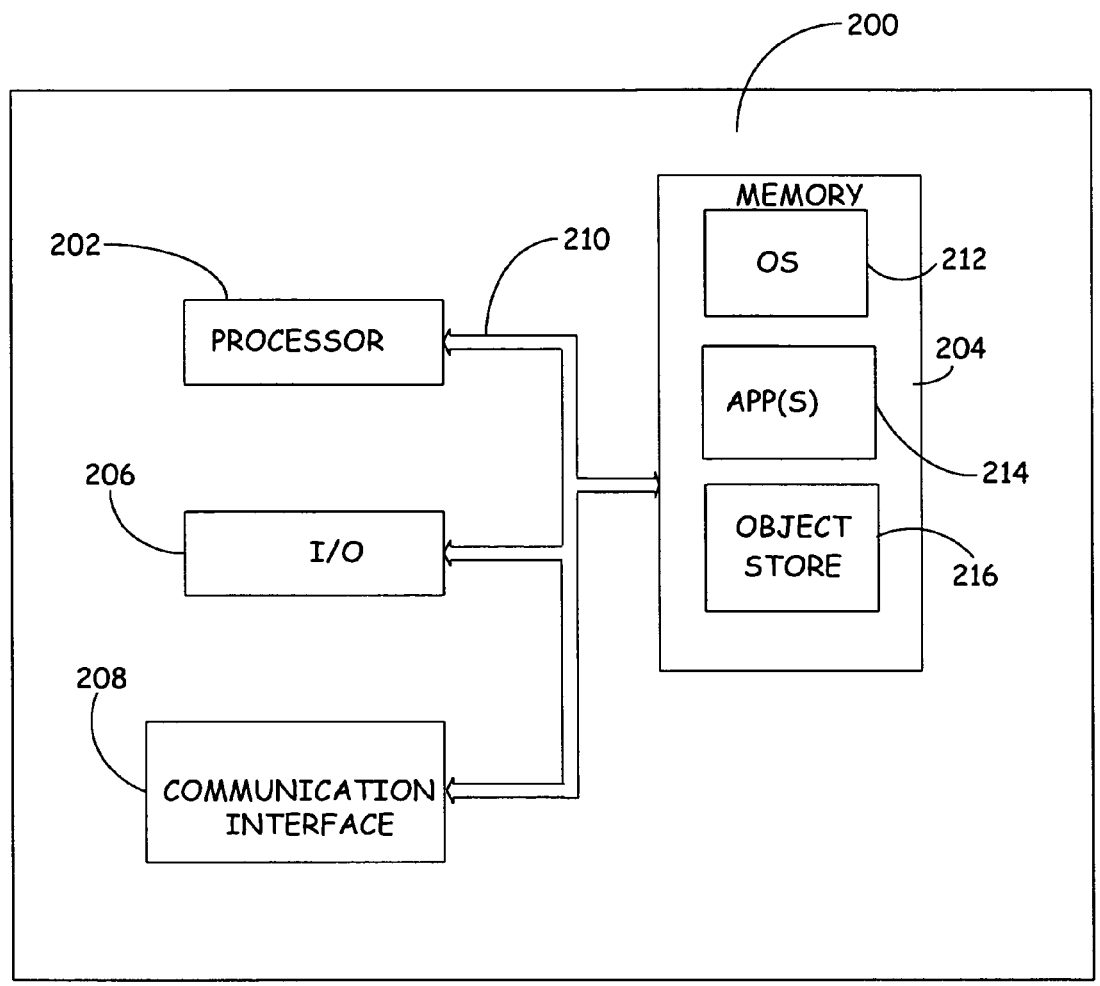
FIG. 2 is a block diagram of a general mobile computing environment in which the present invention can be implemented.

FIG. 1 illustrates an example of a suitable computing system environment 100 on which the invention may be implemented. FIG. 2 illustrates an example of a mobile device computing environment 200. The computing system environments 100 and 200 are only two examples of suitable computing environments, and are not intended to suggest any limitation as to the scope of use or functionality of the invention. Neither should the computing environments 100 and 200 be interpreted as having any dependency or requirement relating to any one or combination of components illustrated in the exemplary operating environment 100. Description of the methods and apparatus of the present invention with general reference to these computer architectures does not limit the invention to currently used computer architectures, but instead, the invention can be implemented on any suitable computer architecture, including future generations of computer architectures.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137. A particular group of application programs are called business applications. These are targeted at the management of companies including—but not limited to—handling the general ledger, inventory, salaries, customers, sales, purchases, financial reports and any other data relevant for a business.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). The input devices are used for creating, modifying, and deleting data. Input devices can also be used for controlling (starting and stopping) the application programs and particular functions herein. The functions include opening (showing) forms and closing the forms. A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. The monitor or other display device is used to show (render) forms.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

FIG. 2 is a block diagram of a mobile device 200, which is an alternative exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200.

As described above, applications presenting information must provide users with as rich an experience as possible on platforms (for example display targets) of very diverse capabilities. These platforms range from rich clients running on the user's desktop, to Web clients running in the user's browser, to PDAs, to telephony based devices, and even speech interfaces. Other platforms are also possible. In accordance with embodiments of the present invention, a schema is employed that prescriptively defines how data types map onto native controls on the platform in question.

A business architect uses his or her knowledge in business engineering to solve problems for his or her customers. However, this person is typically not a computer program developer, and is ideally protected from the intricacies of program development. The present invention provides methods and apparatus which allow a business architect (user) to focus on the business logic of an application, and not on how data is presented on a given platform. The task of presenting the user interface (UI) is handled by the mapping methods of the present invention described herein. The present invention provides a flexible method or mechanism to determine how to deal with user input on a specific platform. The approach of the present invention for dealing with this challenge is a multi-tiered approach.

Models and Maps

Many information systems use models. Examples of models are: object diagrams, Extensible Markup Language (XML) schemas, database definitions, and form definitions. A model is formally defined as a set of objects, each of which has properties, compositions, and associations. In business UIs, the control hierarchies used to render the forms can be regarded as models, such as Windows control trees and Hypertext Markup Language (HTML) object models. Also, models can be used to define the business data, using for example Unified Modeling Language (UML) diagrams and class definitions. In an example framework used to illustrate the methods of the present invention, applications are modeled using business entities. Thus, the business model consists of these business objects called entities, relations between entities, and properties on the entities. See for an example of a simple model 380 the entities 381, 382, 383 and 384 shown in FIG. 3-1. The entities have properties (see for example properties 385 of entity 381) and relationships with other entities (see for example relationship 386 between entities 381 and 384).

When a model is transformed into another model, a map is used explicitly or sometimes implicitly. Maps describe the relationships between models. Some examples include: Extensible Stylesheet Language Transformation (XSLT) which is intended to map XML to XML; controls which are used to render an object model on a specific device surface; mappings of orders from one application to another; and Computer Aided Software Engineering (CASE) tools which map UML to class definitions.

In current business applications, maps are mostly programmed using object-at-a-time mappings, meaning that mappings are coded as "switch" statements in code, which take a particular object as input and return another object. Thus, conventional business applications typically use imperative-maps, maps written in the code of a typical programming language. By using model-at-a-time in accordance with the present invention, it is submitted that productivity can be improved by an order of magnitude. Besides productivity gain, there is a mental gain in perceiving the UI generation problem as a mapping of models to other models using maps. Further, another benefit is the higher abstraction level found in the declaratively defined maps of the present invention. The maps of the present invention are explicit and declarative. The explicit nature of the maps means that the maps are external to the generation engine used to do the mapping or rendering, and that the maps are themselves models. Stated another way, the explicit nature of the maps means that they are defined separately from the controls and the forms. Conventionally, this mapping has been done implicitly inside the controls code or forms code.

The declarative nature of the maps means that the maps are not imperative (coded in a typical programming language). As used herein, the phrase "declaratively defined" means that the maps are not just defined in code as has conventionally been the case, but they are defined in a format which allows the maps to easily be changed. Examples of a declaratively defined format include, but are not restricted to, XML documents, comma-separated files, BizTalk Maps (mapping one data schema to another), and MBF Entity Maps (mapping an object model to a database schema). A wide variety of declarative mapping formats can be used in accordance with the present invention, and which format is chosen is not of particular importance. It is important that the declarative map have a limited set of possibilities, therefore making it easier to provide an intuitive design tool to define the map. In contrast, an imperative map (using code) has nearly unlimited possibilities through the programming language, and therefore it is extremely difficult to create an intuitive design tool. Instead, programming skills are required to create it.

It must be noted that the maps of the present invention, while declarative in nature, need not be only declarative. In instances where it is necessary to create a map that is too complex to be defined declaratively, imperative mapping aspects can be included in the otherwise declarative map. For example, complex functions can be created and included in the map. An example could be that if an Invoice Address and Shipping Address are nearly the same, then only the Invoice Address is shown on the Form. The algorithm for determining whether two addresses are nearly the same could be an implicitly defined function used in the Map.

The present invention provides programming abstractions and a prescriptive architecture suitable for the development and deployment of business applications based on a distributed, service-oriented architecture. The framework insulates business logic written to these abstractions from changes to underlying technologies, preserving the critical asset of a business application development team. The present invention extends approaches to model-driven development, moving from a design-time model with code generation to having true "model aware application services", which can interpret the business model at runtime.

Model-Driven UI Based on Maps

Having the application model is an important feature when generating the UI for a business application built in embodiments of the present invention. A large majority of the UI can be generated solely based on the model of the business logic and maps. When an application developer has modeled a new entity, the UI is derived from this. This is illustrated diagrammatically in FIG. 3-2 which illustrates business model 380 being mapped (as shown at 388) to a UI model 390. Arrow 388 represents the mapping process, as well as a suitably configured mapping engine which uses a map to conduct the mapping process.

Although this mapping can be achieved using traditional coding techniques, the mapping is not as straightforward if certain challenges are to be met. The challenge is that when new property types are created and used in an entity, the coded transformation might not know how to handle the new type and the transformation therefore has to be modified and re-compiled. Another challenge is handling newly developed controls that will only be of value if they are included in the transformation—again this results in re-programming the transformation. The mapping techniques of the present invention do not utilize traditional coding techniques (i.e., they are declarative instead of imperative), and are able to meet these challenges. The platform used in the present invention exposes a layered UI model, and uses maps to transform models from one layer to another. This is described below in greater detail.

The methods and apparatus of the present invention provide a way of calculating how to present business information to the user on a given platform. The invention builds upon the mapping of models onto other models, working from a very abstract model (describing the business entities to interact with) to a concrete model (specifying exactly which device specific control should be used to render the business information). In general, this mapping may involve any number of steps.

Figures 1, 4:
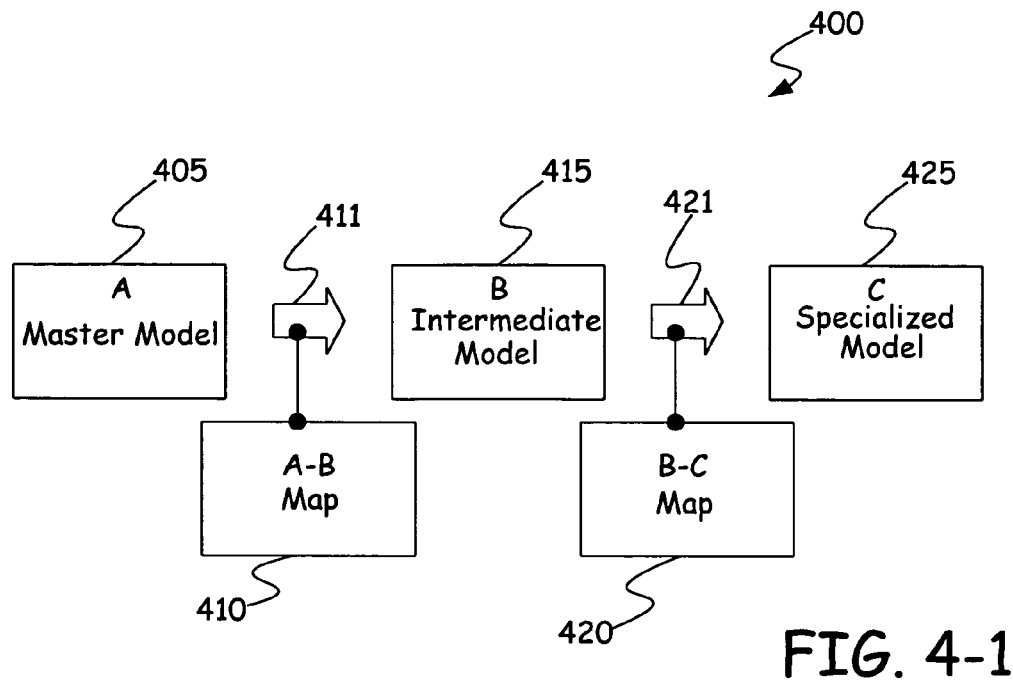
Figures 3, 4:
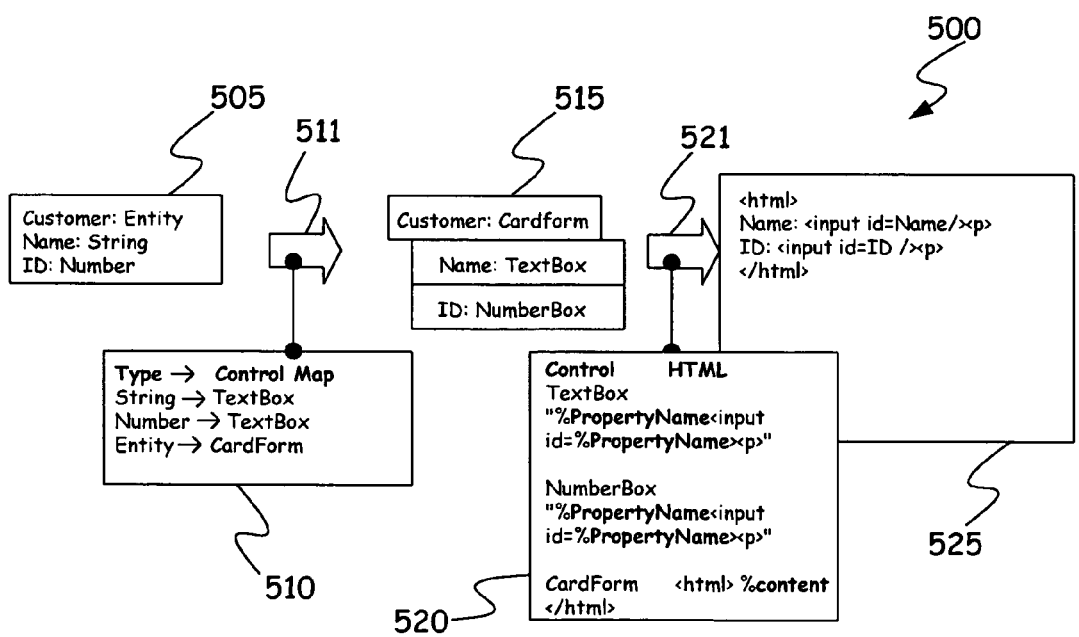
Figures 2, 4:
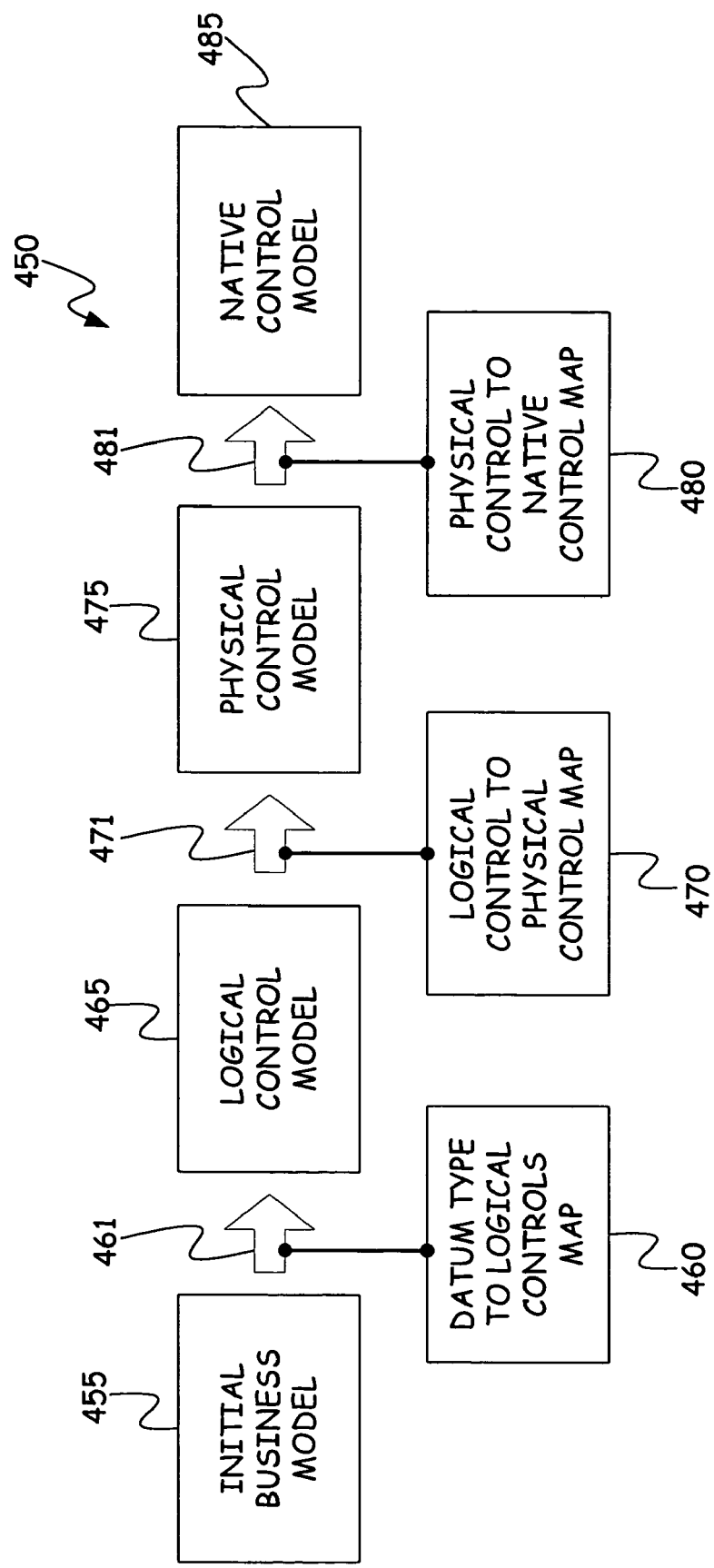

For example, consider the block diagram 400 shown in FIG. 4-1 which illustrates a process of mapping from a master model 405 to a specialized model 425 using two explicit and declarative mapping steps. Master model 405 (i.e., "model A") can be, for example, a database, table, entity, object, or other types of models in a problem domain specific to a user. Master model 405 is mapped to an intermediate model 415 (i.e., "model B") with the mapping step illustrated at 411 using a map 410 (i.e., "A-B map"). Intermediate model 415 can be a display target independent model having logical controls, as will be described below in greater detail. Intermediate model 415 is then mapped to a specialized model 425 (i.e., "model C") with the mapping step illustrated at 421 using a second map 420 (i.e., "B-C Map"). Specialized model 425 can be a display target specific model having physical controls, as will also be described below in greater detail. The arrows used to represent mapping steps 411 and 421 also represent mapping engines which are configured to utilize maps 410 and 420 to implement the mapping steps.

In accordance with some embodiments of the present invention, the mapping scheme involved in determining how to allow the user to interact with business information on the client platform involves at least three steps, as described below and as shown diagrammatically in block diagram 450 of FIG. 4-2. The initial model 455 (see also master model 405 shown in FIG. 4-1) contains information about the business entities that the user must interact with. Each datum of this model is of a particular type. The first step involves determining which logical control to employ for a given type (string, integer, decimal type representing monetary values, addresses containing other values etc) of datum to present.

The logical control to use for the given type is determined using a mapping from data type in model 455 onto logical control in model 465. The mapping process is illustrated at 461, and utilizes a map 460 (i.e., the "datum type to logical control map"). Logical controls have several useful properties. They are completely free from dependencies to any specific display target, but hold properties that govern the behavior of device specific physical controls. The lookup of the logical control is performed taking the type hierarchy into account. If no logical control is specifically suitable for encapsulating the properties of a specific type, the search continues with a base type, until a logical control is found to handle the type.

Once a logical control has been identified from the type of data to represented, the physical control used to actually perform the rendering on the given platform must be found. These physical controls are sometimes referred to as "adapters". This is done using another mapping, yielding the physical control from the logical control and the display target. The mapping process is illustrated at 471, and uses map 470 (i.e., the "logical control to physical control map") to generate physical control model 475 from logical control model 465.

When the client runs on the user's display target, the physical control will be used to create instances of the native controls used to interact with the user. This is done by a third mapping, yielding a set of native controls from the physical control. For instance, if the physical control was an address control, the physical control would map onto native controls for street, city, country. The mapping process is illustrated at 481, and uses map 480 (i.e., the "physical control to native control map") to generate native control model (or display target specific model) 485 from physical control model 475. Again, arrows 461, 471 and 481 also represent the mapping engine(s) used to implement the mapping functions as specified by maps 460, 470 and 480.

The mapping described above may be augmented with other mappings to achieve the desired result. Other factors include the type of form rendered (card or list view), the user role (possibly restricting the information offered to the user). The process of arriving from the abstract model to the concrete model is purely prescriptive (by describing the mappings involved), and flexibility is afforded by being able to change these mappings.

Figures 1, 3:
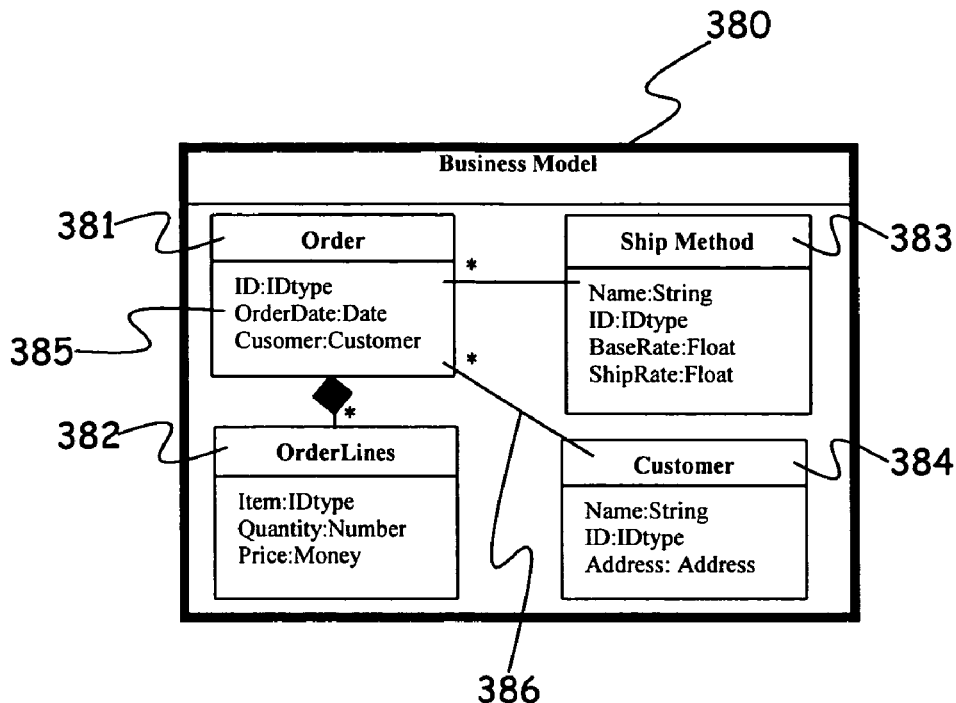
Figures 2, 3:
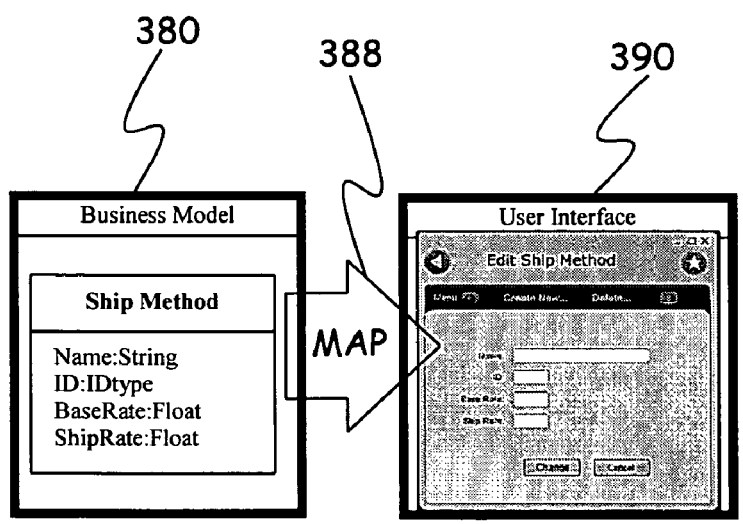

As another example, FIG. 4-3 illustrates a block diagram 500 showing a mapping process for getting from a customer's name and identification number (ID) to the HTML used to render this information in a browser. The master or initial business model 505 is an entity (or object) or class of entities (or class of objects) having the customer's name and ID as properties. The "Name" and "ID" properties of model 505 are of types "String" and "Number", respectively. Model 505 is mapped to a logical control layer of model 515 using a prescriptive map 510. The mapping process is represented at 511. In this example, the data type "String" is mapped to a "TextBox" logical control, while the data type "Number" is mapped to a "NumberBox" logical control.

Next, logical control model 515 is mapped to an HTML model 525 using map 520. The mapping process is represented at 521. In this example, model 525 is a physical control model in the form of an HTML model. Thus, map 520 maps the logical controls of model 515 to HTML tags or elements in model 525. HTML model 525 is then used to render the information from model 505 in a browser. Again, the arrows used to represent mapping steps 511 and 521 also represent suitably configured mapping engines which utilize maps 510 and 520 to implement the mapping process.

Figure 5:
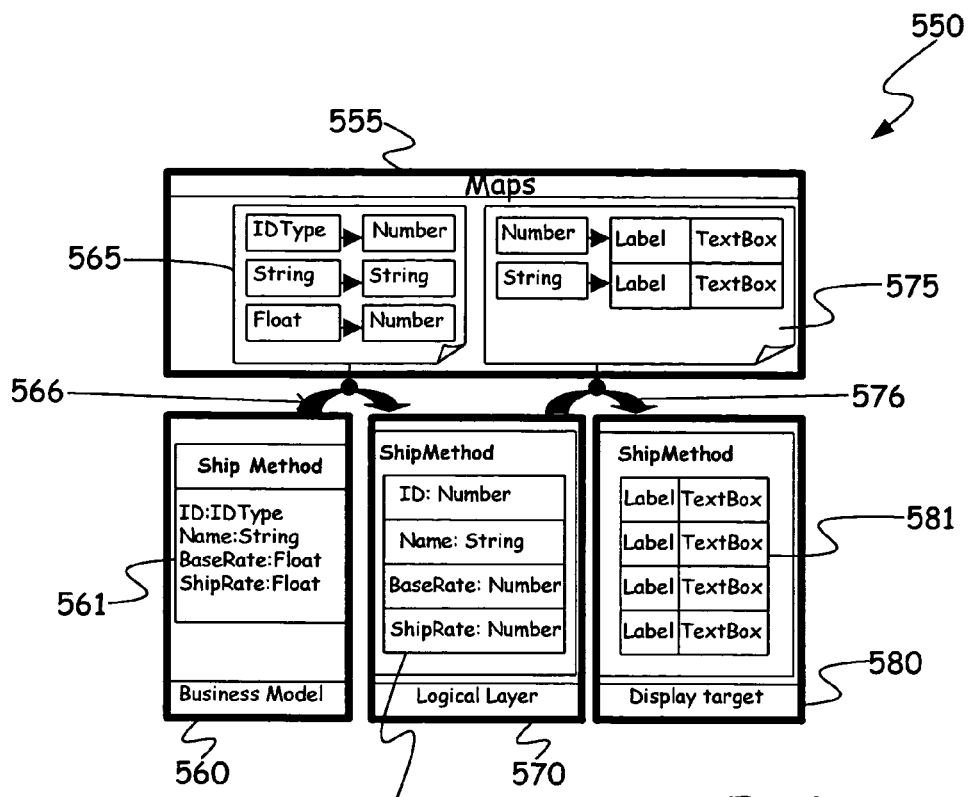
FIG. 5 is a block diagram illustrating an example mapping process in which a business model entity is first mapped to a display target independent form, with the entity properties mapped to controls to create a display target independent logical form, and then the logical form is mapped to the display target(s).

FIG. 5 illustrates a further aspect of embodiments of the present invention in which several different property types can be mapped to the same final controls, so the number of required controls does not necessarily increase when the number of property types increases. As shown in the block diagram of FIG. 5, a business model 560 having properties 561 of different types is mapped to a display target model 580 using maps 555. Similar to previously discussed examples, model 560 is mapped to a logical layer model 570 having logical controls 571. The mapping engine and mapping process, which use map 565, are illustrated at 566. Map 565 maps the datum types ("IDType", "String" and "Float") of the properties 561 of model 560 to logical controls ("Number" and "String"). In this case, both the "IDType" and "Float" datum types map to the "Number" logical control type, while the "String" datum type maps to the "String" logical control type.

Next, logical layer model 570 is mapped to display target model 580 having physical controls 581 specific to a particular display target. Model 570 is mapped to model 580 using map 575, with the process and mapping engine represented at 576. Map 575 maps the logical control types "Number" and "String" of model 570 to the physical control type "TextBox" of model 580, illustrating again that several different types from a particular model can be mapped to a single type on another model. By extension, several different property types from a business model can be mapped to the same final (for example "physical") control.

Developer Experience

When a developer creates a new entity, which is built only from existing types, a default UI is also built via the maps. If the default UI does not offer the desired user experience, the developer can choose to:

Modify the Business Model to reflect the requirements. For example, if the order of fields on the form is wrong, say that ID should be displayed before Name, then the entity could be edited.

Modify the generated logical form model. Switching the Name and ID could also be done in the form. This potentially presents the potential for some maintenance challenges later if the business logic is changed. For example, this raises the issue of whether the change in the business logic overwrites changes in the form.

Modify the map. If the ID is mapped to a Number control but a String control is more suitable, the map is the right place to make the change.

There are a number of benefits to changing the map instead of the more traditional modification of models. First of all, the changes can have a wider scope. If the map entry used in the previous example was changed, all entities using the "IDType" would automatically get the update. This would result in a very consistent UI, which the end user would benefit from.

Another benefit becomes evident when looking at maintenance and future versions of an application. By changing the way models are generated, but not changing the generated models, the master model can be updated, and hereafter the depending models can be regenerated without any risk of conflicts. Not regenerating the forms at all could result in inconsistencies between entities and the forms used to view and edit them. Maps also break the large generation task down into several small declarative map entries.

If the developer creates a new property type, such as "Money", this can be used instantly because the UI will be generated efficiently if only a single map entry is added. In this example the new "Money" property could map to a "Number" control. The developer could also choose to exploit the added metadata information, and create a "Money" Control, and have the property map to the new control. The mapping technology makes both scenarios valid.

The Mapping Language

Mapping uses a simple declarative mapping language which is extensible. Mapping takes one or more tokens as input and returns one or more tokens as output. Given a property type as input, one or more logical controls can be specified as output. It must also be possible to specify the output as null. For example, the "IDType" could be a computer generated field, which the user cannot edit, in which case the type maps to nothing. Also, the mapping can control parameters on the output. For example, the "String" property could result in a wider TextBox compared to the other TextBoxes on the form.

To handle the scoping problem addressed earlier, a scope condition is needed—on the previously discussed example form, "IDTypes" map to "IDControls", but on all other forms a "Number" control is used. Other parameters can also be used as scope, including the business entity, the entity stereotype, the form type, etc. There are other conditions which it would be beneficial to take into consideration when a map is to be performed. One example is the parent control. If the parent control is a list, an enumerator property might choose to map to a drop-down list and not a radio button.

Another condition could be the number of possible selections in the enumerator; radio buttons could be used if there are two or three, but more choices could result in a list. Going down this road, the mapping language will end up being very complex compared to the initial requirement, and another abstraction level on top of the map is needed for developers to understand the maps. This pattern has been seen with Extensible StyleSheet Language Transformations (XSLT), where several tools have been implemented to hide the complexity.

Logical Forms—a UI Model

When mapping from the model of the business logic to the UI model, a layout independent layer, also called a logical layer, is inserted. If it is believed that the model of the business logic can be mapped to the final UI regardless of the display target, the logical layer is a straightforward abstraction. Some metadata will be common for all the display targets such as the business entity itself, and some parts will be specific for the specific display target. The logical layer is the common part.

Figure 6:
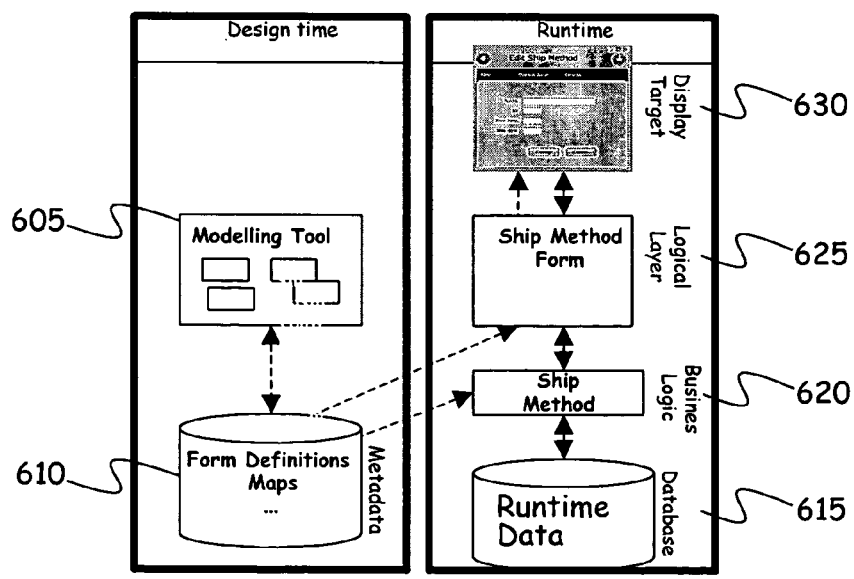
FIG. 6 is a block diagram illustrating design-time and run-time aspects of the present invention, and illustrating that the logical layer is the bridge between the business logic and the display target.

FIG. 6 is a diagrammatic illustration of the design time activities and run-time activities used to create forms. At design time, modeling tools 605 are used to create models or form definitions and maps such as those discussed above. These form definitions and maps can be stored in a metadata database 610.

At run-time, the models or forms are mapped to logical layer model 625. Logical layer model 625 is also generated using run-time data stored in database 615 applied to business logic 620. Also at run-time, logical layer model 625 is mapped to a display target model 630 as described previously.

The logical layer-including forms and controls—is the bridge between the business logic 620 and the display targets 630. It has limited knowledge of layout and limited knowledge of the business logic. The logical layer defines the content of a form based on the business entities, and handles common run-time issues such as data binding forms to the run-time instance of the business entities. Furthermore, the logical layer handles security common to all display targets; it provides metadata to each display target and the logical layer can handle input validation.

A business architect or developer can focus on domain-specific business logic and data. When focus is shifted to the UI, the layout details, data binding issues, plumbing code, input validation, hiding of non-readable properties, error handling, etc., is all hidden in the high level of abstraction found in the logical layer. The domain specialist can focus on the contents of the UI-what makes sense for the user to see-and does not need to have in-depth knowledge about specific display targets and their different rendering technologies.

As discussed, the logical forms or logical layer models are built using logical controls. New controls can easily be added, making the logical layer very flexible and extendable. When a new control is developed, it is simply added to existing forms by changing the used maps. Each display target will benefit from the new functionality without having to implement new controls, but if it makes sense, a new control could be introduced.

Display Targets

Figure 7:
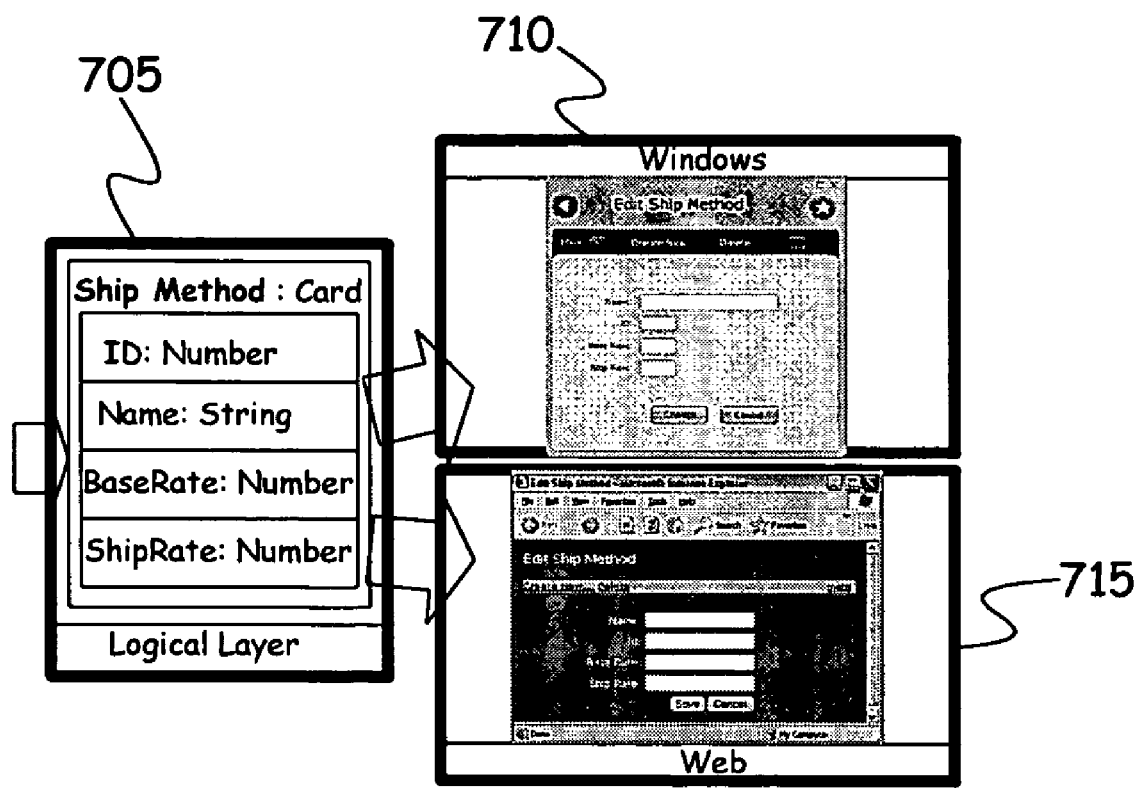
FIG. 7 is a block diagram illustrating logical forms mapped to display target specific rendering technologies.

The logical forms and controls are mapped to specific rendering technologies used by the display targets. As in other FIGS., this is illustrated in FIG. 7 in which logical layer model or form 705 is mapped to several specific display targets. In this particular example, display target 710 uses Windows rendering technology, while display target 715 uses a Web rendering technology. The display targets are responsible for handling all user interactions, including rendering the forms and controls and handling the user input. Each display target needs a number of controls so that the controls in the logical layer are mapped to something meaningful. That is, the property has to be compatible with the value types which the control can handle and the control should render that value in a sensible way. In other words, there are not a specific number of controls that need to be available in each display target, as the mapping technology has a significant impact on this.

The display targets control the user interaction and essentially also the interaction paradigm. A Web page and a Windows Forms window might be generated based on the same logical form, but whether they use a chatty interaction policy or a chunky post back policy is naturally determined by the display target. Each display target chooses how much of a form that is displayed to the user. A Windows form can hide information on tab pages, while a Web page can choose to show all the information at once. These decisions are made based on the logical form, which the display targets obtain. Different display targets need additional information to make such paging decisions, and similarly the logical forms and controls can be annotated with display target specific information.

Although the present invention has been described with reference to particular embodiments, workers skilled in the art will recognize that changes may be made in form and detail without departing from the spirit and scope of the invention. For example, some embodiments of the invention include mapping a data model (or problem domain model) to a user interface model. This is accomplished using one or more maps to map to one or more intermediate models, for example a logical control model, a physical control model and a native control (display target specific) model. Any of these models can be considered to be the user interface model in the context of the invention.

What is claimed is:

1. A method of generating a model driven form user interface, the method comprising:
providing a data model having datum, with each datum of the data model being of a particular datum type; and
generating a user interface model by mapping the data model to the user interface model using a plurality of declarative maps in a plurality of steps, wherein mapping the data model to the user interface model using the plurality of declarative maps in a plurality of steps further comprises mapping the data model to a layout independent logical control model using a first declarative map, and mapping the logical control model to a physical control model using a second declarative map, wherein mapping the data model to the layout independent logical control model further comprises using the first declarative map to map at least two different datum types of the data model to a single logical control type in the logical control model, the single logical control type being free from dependencies to any specific display target, but holding properties that govern the behavior of device specific physical controls.

2. The method of claim 1, wherein the step of mapping the data model to the logical control model using the first declarative map further comprises mapping the data model to the logical control model using a first declarative and explicit map.

3. The method of claim 2, wherein the step of mapping the data model to the logical control model using the first declarative and explicit map comprises mapping the data model to the logical control model using a map which is external to a mapping engine used to generate the logical control model.

4. The method of claim 3, wherein the first declarative and explicit map is a model used by the mapping engine to generate the logical control model.

5. The method of claim 3, wherein the step of providing the data model further comprises providing a database.

6. The method of claim 3, wherein the step of providing the data model further comprises providing a table.

7. The method of claim 3, wherein the step of providing the data model further comprises providing an entity.

8. The method of claim 3, wherein the step of providing the data model further comprises providing an object.

9. The method of claim 3, wherein the step of mapping the data model to the logical control model further comprises using the first declarative and explicit map to map each of the datum types in the data model to one of a plurality of logical controls available for use in the logical control model.

10. The method of claim 9, wherein each of the plurality of logical controls in the logical control model is free from dependencies to any specific display target such that the logical control model is a display target independent model.

11. The method of claim 10, wherein the physical control model has a plurality of physical controls available for use in rendering the logical control model on a display target, and wherein mapping the logical control model to the physical control model using the second declarative and explicit map further comprises using the second declarative and explicit map to map each of the logical controls in the logical control model to one of the plurality of available physical controls.

12. The method of claim 11, wherein the physical control model is the user interface model.

13. The method of claim 11, wherein mapping the data model to the user interface model using the at least one declarative map further comprises mapping the physical control model to a native control model using a third declarative and explicit map.

14. The method of claim 13, wherein the native control model has a plurality of instances of native controls used to interact with a person, and wherein mapping the physical control model to the native control model using the third declarative and explicit map further comprises using the third declarative and explicit map to map each of the physical controls in the physical control model to one of the plurality of native controls in the native control model.

15. The method of claim 14, wherein the native control model is the user interface model.

16. The method of claim 11, wherein mapping the logical control model to the physical control model using the second declarative map further comprises using the second declarative map to map at least two different logical control types in the logical control model to a single physical control in the physical control model.

17. A computer storage medium having computer-executable instructions for performing form user interface generating steps comprising:
identifying a data model having datum, with each datum of the data model being of a particular datum type; and
generating a user interface model by mapping the data model to the user interface model using a plurality of declarative maps in a plurality of steps, wherein mapping the data model to the user interface model using the plurality of declarative maps in a plurality of steps further comprises mapping the data model to a layout independent logical control model using a first declarative map, and mapping the logical control model to a physical control model using a second declarative map, wherein mapping the data model to the layout independent logical control model further comprises using the first declarative map to map at least two different datum types of the data model to a single logical control type in the logical control model, the single logical control type being free from dependencies to any specific display target, but holding properties that govern the behavior of device specific physical controls, and wherein mapping the logical control model to the physical control model further comprises using the second declarative map to map at least two different logical control types in the logical control model to a single physical control in the physical control model.

18. The computer storage medium of claim 17, wherein the step of mapping the data model to the logical control model using the first map comprises mapping the data model to the logical control model using a map which is external to a mapping engine used to generate the logical control model.

19. The computer storage medium of claim 18, wherein the step of mapping the data model to the logical control model further comprises using the first map to map each of the datum types in the data model to one of a plurality of logical controls available for use in the logical control model.

20. The computer storage medium of claim 19, wherein each of the plurality of logical controls in the logical control model is free from dependencies to any specific display target such that the logical control model is a display target independent model.

21. The computer storage medium of claim 20, wherein the physical control model has a plurality of physical controls available for use in rendering the layout independent logical control model on a display target, and wherein mapping the logical control model to the physical control model using the second map further comprises using the second map to map each of the logical controls in the logical control model to one of the plurality of available physical controls.

22. The computer storage medium of claim 21, wherein the physical control model is the user interface model.

23. The computer storage medium of claim 21, wherein mapping the data model to the user interface model using the at least one declarative map further comprises mapping the physical control model to a native control model using a third map.

24. The computer storage medium of claim 23, wherein the native control model has a plurality of instances of native controls used to interact with a person, and wherein mapping the physical control model to the native control model using the third map further comprises using the third map to map each of the physical controls in the physical control model to one of the plurality of native controls in the native control model.

25. The computer storage medium of claim 24, wherein the native control model is the user interface model.

* * * * *